US006943346B2

(12) United States Patent
Tan et al.

(10) Patent No.: US 6,943,346 B2
(45) Date of Patent: Sep. 13, 2005

(54) METHOD AND APPARATUS FOR MASS SPECTROMETRY ANALYSIS OF AEROSOL PARTICLES AT ATMOSPHERIC PRESSURE

(75) Inventors: Phillip V. Tan, Columbia, MD (US); Vladimir M. Doroshenko, Ellicott City, MD (US)

(73) Assignee: Science & Engineering Services, Inc., Columbia, MD (US)

( * ) Notice: Subject to any disclaimer, the term of this patent is extended or adjusted under 35 U.S.C. 154(b) by 39 days.

(21) Appl. No.: 10/639,508

(22) Filed: Aug. 13, 2003

(65) Prior Publication Data

US 2005/0035285 A1 Feb. 17, 2005

(51) Int. Cl.[7] .......................... H01J 49/04; B01D 54/44

(52) U.S. Cl. ....................... 250/288; 250/286; 250/281; 250/282; 250/343; 73/863.11; 73/863.12

(58) Field of Search ................................ 250/288, 286, 250/281, 282, 343; 73/863.11, 863.12

(56) References Cited

U.S. PATENT DOCUMENTS

| | | | | | |
|---|---|---|---|---|---|
| 4,924,097 | A | * | 5/1990 | Browner et al. | 250/343 |
| 5,285,064 | A | * | 2/1994 | Willoughby | 250/288 |
| 5,498,545 | A | | 3/1996 | Vestal | |
| 5,917,185 | A | | 6/1999 | Yeung et al. | |
| 5,965,884 | A | | 10/1999 | Laiko et al. | |
| 6,175,112 | B1 | | 1/2001 | Karger et al. | |
| 6,797,945 | B2 | * | 9/2004 | Berggren et al. | 250/288 |
| 2002/0158196 | A1 | | 10/2002 | Berggren et al. | |
| 2002/0166961 | A1 | | 11/2002 | Berggren et al. | |

FOREIGN PATENT DOCUMENTS

| | | |
|---|---|---|
| EP | 1193730 | 4/2002 |

OTHER PUBLICATIONS

Michael Karas et al., Laser Desorption Ionization of Proteins with Molecular Masses Exceeding 10 000 Daltons, Anal. Chem. Oct. 15, 1988, vol. 60, pp. 2299–2301.

John B. Fenn et al., Electrospray Ionization for Mass Spectrometry of Large Biomolecules, Science, Oct. 6, 1989, vol. 246, pp. 64–71.

Kermit K. Murrary, Coupling Matrix–Assisted Laser Desorption/Ionization to Liquid Separations, Mass Spectrometry Reviews, 1997, vol. 16, pp. 283–299.

Henrik Orsnes et al, Interfaces for On–line Liquid Sample Delivery For Matrix–Assisted Laser Desorption Ionization Mass Spectrometry, Chem. Soc. Rev., 2001, vol. 30, pp. 104–112.

Frantisek Foret et al., Liquid Phase Interfacing and Miniaturization in Matrix–Assisted Laser Desorption/Ionization Mass Spectrometry, Proteomics 2002, vol. 2, pp. 360–372.

Victor V. Laiko et al., Desorption/Ionization of Biomolecules from Aqueous Solutions at Atmospheric Pressure Using an Infrared Laser at 3 $\mu$m, J. Am. Soc. for Mass Spectrom 2002, vol. 13, pp. 354–361.

(Continued)

*Primary Examiner*—Nikita Wells
(74) *Attorney, Agent, or Firm*—Oblon, Spivak, McClelland, Maier & Neustadt, P.C.

(57) ABSTRACT

An apparatus and method for generating ions from an aerosol and transferring the ions into a mass analyzer. In the apparatus and method, an aerosol beam is generated, the aerosol beam is directed to a spatial volume outside the mass analyzer, particles in the aerosol beam are ionized to produce the ions, and the ions are collected into the mass analyzer. As such the apparatus includes respectively an aerosol beam generator, an ion source generator, and an ion collector.

75 Claims, 9 Drawing Sheets

OTHER PUBLICATIONS

Kermit K. Murray et al, Aerosol Matrix–Assisted Laser Desorption Ionization for Liquid Chromatography/Time–of–Flight Mass Spectrometry, Anal. Chem. 1994, vol. 66, pp. 1601–1609.

Bashir A. Mansoori et al., Matrix–Assisted Laser Desorption/Ionization of Size– and Composition–Selected Aerosol Particles, Anal. Chem. 1996, vol. 68, pp. 3595–3601.

Lin He et al., 337 nm Matrix–Assisted Laser Desorption/Ionization of Single Aerosol Particles, Journal of Mass Spectrometry 1999 vol. 34, pp. 909–914.

Peng Liu et al, Generating Particle Beams of Controlled Dimensions and Divergence: II. Experimental Evaluation of particle Motion in Aerodynamic Lenses and Nozzle Expansions, Aerosol Science and Technology 1995 vol. 22, pp. 314–324.

Paul J. Galley et al., Technique for Producing Capillaries with Reproducible Orifice Diameters for Uniform Droplet Generation, Applied Spectroscopy, 1992, vol. 46, No. 10, pp. 1460–1463.

Feng et al., Single Isolated Droplets With Net Charge as a Source of Ions, J. Am. Soc. Mass Spectrom 2000, vol. 11, pp. 393–399.

G. Allmaier, Picoliter to Nanoliter Deposition of Peptide and Protein Solutions for Matrix–Assisted Laser Desorption/Ionization Mass Spectrometry, Rapid Communications in Mass Spectrometry, 1997 vol. 11, pp. 1567–1569.

David Ericsson et al., Downsizing Proteolytic Digestion and Analysis Using Dispenser–Aided Sample Handling and Nanovial Matrix–Assisted Laser/Desorption Ionization–Target Arrays, Proteomics 2001, vol. 1, pp. 1072–1081.

Daniel P. Little et al., MALDI on a Chip: Analysis of Arrays of Low–Femtomole to Subfemtomole Quantities of Synthetic Oligonucleotides and DNA Diagnostic Products Dispensed by a Piezoelectric Pipet, Anal. Chem. 1997, vol. 69, pp. 4540–4546.

Koichi Tanaka et al., Protein and Polymer Analyses up to m/z 100 000 by Laser Ionization Time–of–flight Mass Spectrometry, Rapid Communications in Mass Spectrometry, vol. 2, No. 8, 1988, pp. 151–153.

* cited by examiner

METHOD AND APPARATUS FOR MASS SPECTROMETRY ANALYSIS OF AEROSOL PARTICLES AT ATMOSPHERIC PRESSURE

DISCUSSION OF THE BACKGROUND

1. Field of the Invention

This invention relates to mass spectrometers, and in particular to MALDI ion sources and on-line MALDI ion sources for mass spectrometers. This invention also relates to the field of aerosol mass spectrometry.

2. Background of the Invention

Matrix-assisted laser desorption/ionization (MALDI) mass spectrometry (MS) has been used extensively for the analysis of nonvolatile and thermally labile biomolecules of large molecular weight. MALDI techniques, as described by Karas and Hillenkamp in Anal. Chem. 1988; 60:2299–2301, and as described by Tanaka et al. in Rapid Commun Mass Spectrom 1988; 2:151–153, the entire contents of which are incorporated herein by reference, can detect molecular ions with masses greater than 100,000 Da.

In a typical MALDI configuration, solid samples are placed under vacuum, where a short-pulsed laser is used to ionize analytes into a mass spectrometer which separates ions according to a mass-to-charge ratio. Almost all MALDI-MS work was initially completed with time-of-flight mass analyzers due to their theoretically unlimited mass range and the requirement of a single start event for data acquisition being well matched with the pulsed laser sources utilized in MALDI.

Recently, ion-traps and Fourier transform ion-cyclotron resonance mass spectrometers have been applied to MALDI configurations. The capability to conduct tandem mass spectrometry (i.e., $MS^n$) has been important for obtaining structural information from MALDI ions which often undergo little or no fragmentation during the desorption/ionization process.

MALDI systems currently in use apply either an UV or IR wavelength laser. Chemical matrix materials, which are combined with the analyte, are chosen to have strong absorption coefficients at the selected laser wavelength. Although the details of the MALDI process are still not definitively known, it is generally believed that energizing the matrix by laser adsorption transfers some of the laser energy to the analyte in a controlled fashion, serving to ionize individual sample molecules.

Sample preparation is paramount to producing good spectral reproducibility and quality in MALDI analyses because changes in the degree of analyte incorporation into matrix crystals affect signal suppression. A variety of matrices and sample preparation techniques have been empirically developed to attempt to create uniform samples and eliminate "sweet spots" (i.e., a term of art used to describe areas that have particularly good spectral response). The most common method utilized in MALDI is a dried droplet method whereby a mixed matrix and an analyte are dispensed together onto a MALDI target plate, and allowed to dry and co-crystallize at room temperature. Other combinations of matrix and analyte dispensing, either mixed or separately, have also been used. Regardless of the sample preparation method, poor uniformity in crystallization results in spot-to-spot differences on the target plate resulting in some sample regions being matrix-rich and not having an optimal matrix-to-analyte molar ratio. Furthermore, despite care in sample preparation, MALDI analysis yields little quantitative information about chemical concentrations.

Fenn et al. in Science, 1989; 246:64–71, the entire contents of which are incorporated herein by reference, describe another soft ionization technique termed electrospray ionization (ESI) used to ionize large biomolecules. In contrast to MALDI, ESI provides a continuous and reproducible source of gas phase ions for MS analysis. ESI utilizes a capillary at high electric potential relative to an opposing plate at near ground potential. Analyte solution contained in the capillary is drawn out by the high electric potential acting on ions in the solution, and small droplets are formed which become ionized when a carrier solvent is vaporized. Because ESI produces analyte gas phase ions from solution, complex MALDI sample preparation techniques of spotting and drying are avoided. However, ESI tends to output multiply charged ions which are difficult to interpret, in contrast to MALDI ions which typically produces singly-charged ions. Thus, there is generally a trade-off between the on-line reproducible analysis from ESI which suffers from complicated interpretation and the off-line less reproducible analysis from MALDI which benefits from simplified interpretation.

Automated sampling handling systems for MALDI analyses have been developed. Automated sampling handling systems range from techniques which load sample plates into vacuum load-locks, such as described for example by Vestal et al. U.S. Pat. No. 5,498,545, the entire contents of which are incorporated herein by reference, to more complicated on-line techniques which attempt to introduce samples into vacuum without contamination, while at the same time evaporating solvent and maintaining the mass spectrometer's vacuum. The latter technique being described for example by Murray, KK. in Mass Spectrom. Rev. 1997; 16:283–299 and by Orsnes et al. Chem Soc Rev 2001; 30:104–112, the entire contents of which are incorporated herein by reference.

A continuous flow (CF) probe is one such on-line technique. In CF-MALDI, a liquid matrix containing a sample is continuously delivered to the end of a probe for laser ionization. By adding a frit to the probe, solid matrices could be crystallized and analyzed with minimal memory effects. Enhancement of the CF-MALDI technique are possible by applying light-absorbing material to the buffer or to the solvent before direct laser vaporization and ionization in the mass spectrometer vacuum. CF-MALDI techniques are described by Yeung et al., U.S. Pat. No. 5,917,185, the entire contents of which are incorporated herein by reference. Another technique involves the use of a rotating ball inlet (ROBIN). ROBIN involves continuous deposition and crystallization of analyte solution onto a rotating surface, followed by transfer into vacuum and direct UV MALDI. One rotating design is based on a rotating quartz wheel where a moving sample holder is applied. This design is described by Karger et al. U.S. Pat. No. 6,175,112, the entire contents of which are incorporated herein by reference. As with CF-MALDI, the ROBIN technique requires adequate surface cleaning procedures to ensure regenerated samples are not contaminated with previous analytes. Because of the delay between sample deposition and analysis, ROBIN is considered to be an "in-line" technique. See for example Foret et al., Proteomics. 2002; vol. 2, pp. 360–372, the entire contents of which are incorporated herein by reference.

One general difficulty with the on-line MALDI-MS techniques is that the sample is often laser desorbed/ionized with a solvent. The solvent can result in adduct formation and lower quality spectra. Furthermore, the challenges in maintaining both sensitivity and mass resolution and the complexity of operating at vacuum pressures have greatly reduced the acceptance of any of these techniques.

Indeed, high vacuum conditions pose significant obstacles to the practical implementation of on-line MALDI-MS. By contrast, the capability of conducting MALDI analyses at atmospheric pressure (AP) greatly simplifies instrumentation. AP-MALDI is a technique which permits MALDI at or near atmospheric pressures. See for example, Laiko et al. U.S. Pat. No. 5,965,884, the entire contents of which are incorporated herein by reference. Comparisons between AP-MALDI and vacuum MALDI spectra show many similarities of singly-charged, intact molecular ions. However, AP-MALDI results reveal even less fragmentation than vacuum MALDI. The soft ionization of AP-MALDI is likely due to collisions of ions with surrounding gas, therefore thermalizing ions before fragmentation occurs, ultimately producing spectra with a high signal-to-noise. Analyte-matrix cluster ions can complicate mass spectra. While cluster effects are mostly absent at m/z values below 2000 Da, declustered by adjusting skimmer-nozzle or skimmer-octapole voltages, depending on the mass spectrometer configuration, can be used. Further matrix declustering can be removed by increasing an intake capillary temperature to the mass analyzer, or by increasing the laser energy. In each case, de-clustering can be affected with ion heating techniques prior to mass analysis.

Developments in AP-MALDI have also demonstrated the ability to conduct laser desorption/ionization without the need for an additional chemical matrix by applying IR irradiation to aqueous solutions. See for example Laiko VV et al., J. Am. Soc. Mass Spectrom. 2002; 13:354–361, the entire contents of which are incorporated herein by reference. Because water has a strong absorption for IR wavelength energy, and aqueous samples can be easily maintained in liquid phase at atmospheric pressure as opposed to vacuum conditions, this matrix-free laser desorption/ionization simplifies MALDI-type sample preparation.

Further, AP-MALDI has the potential to be coupled to liquid solutions via an in-line approach that would deposit sample onto target plates that would be fed into the ion source for analysis. Such an approach, however, introduces delay between sample deposition (and therefore the requisite drying) and analysis. Furthermore, target cleaning and potential contamination of the laser target would have to be controlled. Another approach for on-line AP-MALDI has been described by Orsnes et al. in European Patent App No. 00810890.4, the entire contents of which are incorporated herein by reference. In this technique, a solution is fed to the end of a capillary where a laser is used for desorption/ionization. However, this technique along with all the above mentioned techniques still requires a sample substrate (i.e. a collection surface) for the analyte and matrix. The collection surface poses challenges to reproducibility and frequently introduces contamination.

In vacuum aerosol MALDI described by Murray et al., Anal. Chem. 1994; 66:1601–1609, and Mansoori et al, Anal. Chem. 1996; 68:3595–3601, the entire contents of which are incorporated herein by reference, aerosol techniques have been applied to conduct mass analysis on discrete aerosol particles. In vacuum aerosol MALDI, aerosols from mixed matrix and analyte can be generated at microliter/minute flow rates with nebulizers or piezoelectric aerosol generators. See for example, Murray and He, J. Mass Spectrom. 1999; 34:909–914, the entire contents of which are incorporated herein by reference. By this approach, an aerosol passes from atmospheric pressure to vacuum where particles introduced into the vacuum are available for UV MALDI. One difficulty with this approach is inefficient sample transfer due to a large loss of aerosols in the pumping stages of the inlet, thus consuming large amounts of sample without analysis. Results with vacuum aerosol MALDI show poor mass resolution, likely due to elevated pressures in the mass spectrometer's source from the evaporating solvent.

Aerosols have also been used in mass spectrometer ion sources at atmospheric pressure, but non laser-based ionization techniques have been applied such as field desorption ionization or corona discharge ionization. See for example Berggren et al. U.S. patent application Ser. No. 2002,0166,961, the entire contents of which are incorporated herein by reference. Berggren et al describe a droplet ion source in which individual charged droplets are trapped, then field desorbed and ionized, and finally aerodynamically focused using an aerodynamic lens into a mass spectrometer for analysis. Features of the aerodynamic lens are described by Liu et al. in Aerosol Sci. Technol. 1995; 22:314–324, the entire contents of which are incorporated herein by reference. Without using aerodynamic focusing, the results show a poor transmission of ions into the vacuum of the MS. See for example Feng et al. J. Am. Soc. Mass Spectrom. 11, 393–399 (2000), the entire contents of which are incorporated herein by reference. Berggren et al. describe in U.S. patent application Ser. No. 2002,0158,196, the entire contents of which are incorporated herein by reference, a piezoelectric aerosol generator interfaced to a MS ion source where, once again, field desorption ionization was applied to ionize small droplets. Hager et al. in Appl. Spectrosc., 46, 1460–1463 (1992), the entire contents of which are incorporated herein by reference, describe a technique whereby a neutral aerosol was charged using a corona discharge, but ion sensitivities were not as high as conventional ESI.

Other work with aerosol generators and mass spectrometry have focused on improved sample preparation techniques of target surfaces. See for example, Allmaier G., Rapid Commun. Mass Spectrom. 1997; 11:1567–1569; Ericsson et al., Proteomics. 2001; 1: 1072–1081; and Little et al. Anal. Chem. 1997; 69:4540–4546, the entire contents of which are incorporated herein by reference.

In short, prior techniques have suffered from either substrate contamination issues where matrix enhancement effects have been used or have suffered from compromises in mass spectrometer performance in those techniques which have introduced samples in a "substrate-less" technique into the mass spectrometer. The degradation in mass spectrometer performance can be attributed to the high gas loading occurring as solvents carrying the samples evaporate inside the mass spectrometer creating not only gas loading for the vacuum system of the mass spectrometer, but also potential problems with recondensation of the solvent on electronic components in the mass spectrometer.

SUMMARY OF THE INVENTION

A technique combining rapid, reproducible sample preparation with MALDI analysis is desirable. Indeed, a "substrate-free" method such as that of the present invention for on-line MALDI at or near atmospheric pressure provides a technique for reproducible MALDI analyses from minute quantities of an analyte.

Accordingly, one object of the present invention is to generate MALDI-type ions uniformly and nearly continuously from an aerosol source of the present invention which is ionized completely free of a substrate. As such, the complexities of sample in vacuo introduction are avoided Accordingly, another object of the present invention is to provide a mechanism for conducting on-line MALDI or on-line laser desorption/ionization (LDI) at or near atmospheric pressure and free from a sample collection surface (i.e. not from a substrate).

A further object of the present invention is to provide a mechanism for on-line aerosol-MALDI or aerosol-LDI mass spectrometry, that is substrate-free and produced at or near atmospheric pressure.

These and other objects of the present invention are achieved in an exemplary mass spectrometry system in which an aerosol is generated from a solution containing a matrix, and dried with the matrix in-transit from an initial aerosol formation region to a downstream ionization region. An aerosol containing the analyte to be mass analyzed can be sampled from an existing aerosol and both collimated and dried with a matrix material in-transit from sampling to downstream ionization. Regardless of the aerosol production and drying technique, the aerosol is directed to a spatial volume outside the mass spectrometer, and a pulsed laser is focused in this region to laser desorb/ionize the aerosol.

In one aspect of the present invention, an electric field is established in the region of laser ionization to guide ions into the mass spectrometer. Because the aerosol is ionized in-flight, the subsequent mass analysis involves no sample-substrate interactions. Furthermore, the analysis is carried out at or near atmospheric pressure, obviating the need for complicated atmosphere-to-vacuum sample interfaces.

In one aspect of the present invention, an aerosol is generated in a controlled fashion using techniques such as, but not limited to, piezoelectric nozzles, solenoid microdispenser valves, vibrating orifices, or inkjet dispensers. Such techniques, with the aid of timing devices, allow aerosol generation and pulsed laser ionization to be synchronized.

In yet another aspect of the present invention, a bioaerosol is selectively detected via fluorescence, and similarly synchronized with laser desorption/ionization. Synchronization, according to the present invention, minimizes sample losses from the aerosols of interest, and hence increases sensitivity.

In another aspect of the present invention, an ambient aerosol can be sampled directly at or near atmospheric pressures, collimated, and laser-ionized in an electric field adjacent to or proximate the entrance of a MS. Optical detection of the ambient aerosol can be selectively applied to bioaerosol, by mechanisms such as, but not limited to, fluorescence detection, and the detection can be synchronized with laser desorption/ionization.

Regardless of configuration, either matrix-assisted (i.e. MALDI) or matrix-free conditions can be applied advantageously.

The present invention is applicable to mass spectrometers with atmospheric pressure interfaces, including but not limited to, quadrupole ion-trap MS and orthogonal-time-of-flight MS. In addition, the present invention is applicable for ionization of condensed phase material of both polydisperse and monodisperse sizes, at both positive and negative polarity. The laser for desorption/ionization may be in the UV or IR wavelength region where appropriate matrix and aerosol conditioning suitable for the laser wavelength are applied.

The present invention eliminates potential contamination and chemical reactions caused by a collection substrate and sample interactions with the substrate or residual materials on the collection substrate from previous samplings. According to the present invention, liquid samples can be aerosolized and the generated aerosol ionized in an electric field adjacent to the entrance of an atmospheric pressure inlet of a mass spectrometer. Further, arrival of the generated aerosol in the spatial volume outside to the mass spectrometer entrance can be synchronized with a pulsed desorption/ionization laser so that analytical efficiency is maximized.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
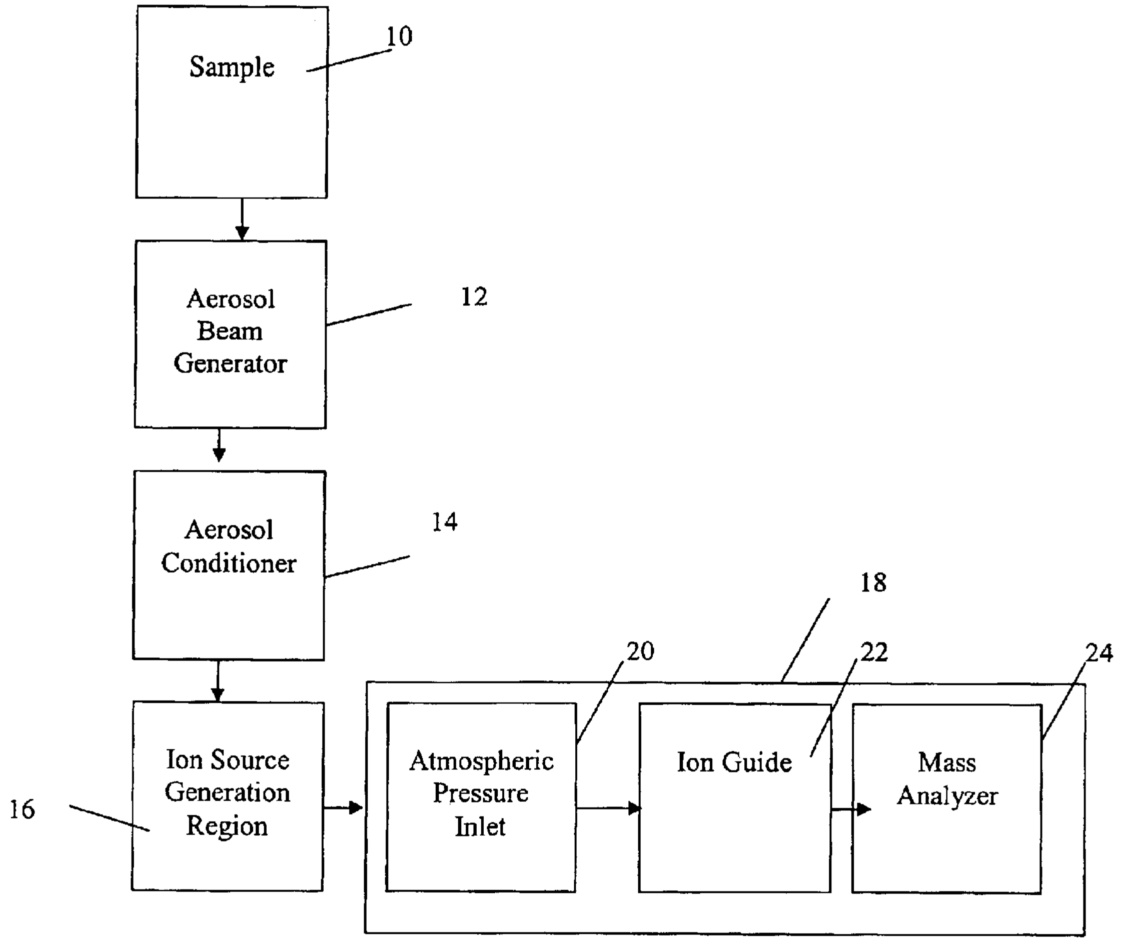
FIG. 1 is a block diagram of one preferred embodiment of the present invention.

Referring now to the drawings, wherein like reference numerals designate identical, or corresponding parts throughout the several views, and more particularly to FIG. 1 thereof, one of the preferred embodiments is shown in FIG. 1. The present invention involves introducing a sample 10 into an aerosol beam generator 12. The aerosol generator 12 produces an aerosol beam that is subsequently conditioned in an aerosol beam conditioner 14. The conditioned aerosol beam is then ionized in an ion source generation spatial volume 16, and subsequently introduced into a mass spectrometer 18 for mass analysis. The mass spectrometer 18 includes an atmospheric pressure inlet 20 as an ion entrance, an ion guide 22 to direct charged components, and a mass analyzer 24 where ions are separated and detected according to their mass-to-charge ratio. The atmospheric pressure inlet 20 operates with an input pressure at or near atmospheric pressures (e.g. 100–1000 Torr).

Figures 2A, 2B:
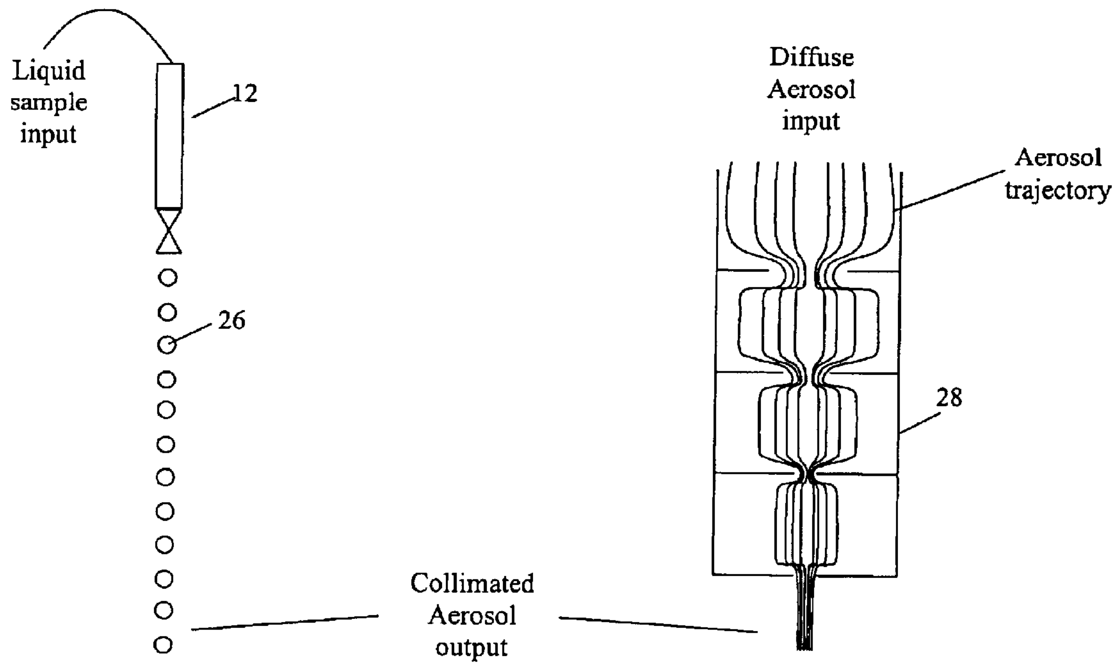
FIGS. 2A–B are schematics illustrative of aerosol beam generator arrangements employed in the present invention to produce a low divergence column of aerosol.

The aerosol formed in the aerosol beam generator 12 can be generated, according to the present invention, from a liquid sample input using a variety of microdispensing technologies to create a collimated, controlled aerosol beam 26 such as shown in FIG. 2A. For example, solenoid microdispensing valves can provide controlled dispensing of liquid. Piezoelectric pipettes/capillaries, vibrating orifice and droplet-on-demand inkjet nozzles are other examples of aerosol beam generators known in the art which can be applied in the present invention to produce the aerosol beam 26. Commercially-available aerosol beam generators such as, but not limited to, a vibrating orifice aerosol generator (VOAG—TSI, Inc. Shoreview, Minn.), a Picopipette (Engineering Arts, Mercer Island, Wash.), a solenoid valve (The Lee Company, Westbrook, Conn.), and a microdrop system (MicroDrop, Muhlenweg, Germany) along with other mechanisms known in the art are, according to the present invention, well suited devices for aerosol beam generation. These techniques can provide controlled delivery of nanoliter to picoliter quantities of aerosol over travel distance in air (i.e. atmospheric pressure) of typically greater than 25 cm. These techniques can provide the aerosol for subsequent ionization into regions at or near atmospheric pressures (e.g. 100–1000 Torr).

In another embodiment of the present invention, an aerosol beam can also be generated from an existing aerosol source including ambient airborne particulate matter. In this case, as shown illustratively in FIG. 2B, a diffuse sample input is focused into a tight beam using an aerodynamic lens 28. Aerodynamic focusing is known in the art. An example is given in U.S. Pat. No. 6,386,015, the entire contents of which are incorporated by reference. Other systems known in the art including those described in the aforementioned Berggren et al. reference can be implemented in the present invention. The aerodynamic lens 28, according to the present invention, provides a low divergence column of aerosol, preferably smaller than the focus diameter of the laser, for efficient downstream ionization.

Figure 3:
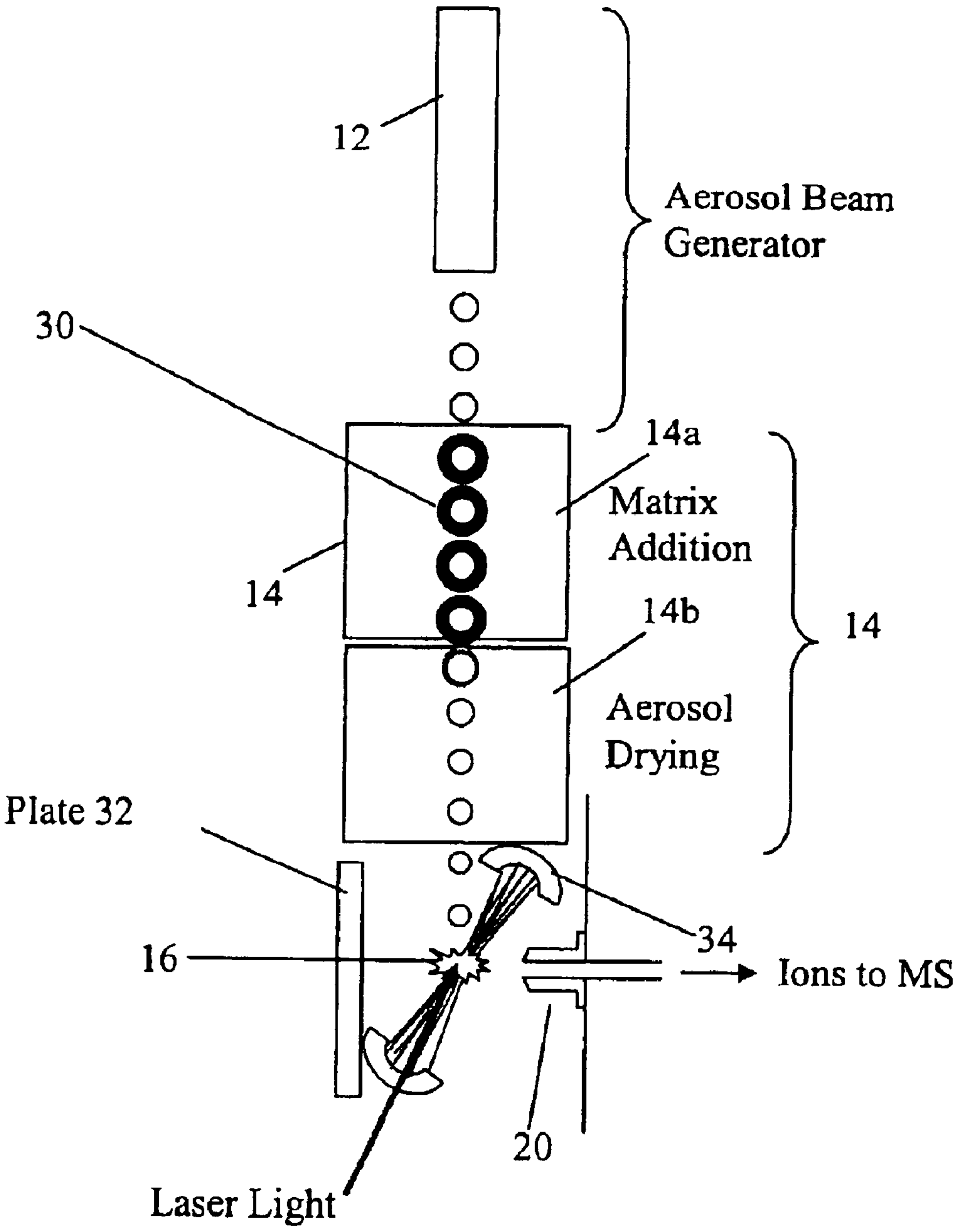
FIG. 3 is a diagram illustrating a general arrangement of the present invention.

After aerosol beam generation, the aerosol is conditioned and ionized. One preferred embodiment of the present invention is shown in FIG. 3. FIG. 3 depicts an aerosol beam generator 12, an aerosol conditioner 14, and an ion source generation volume 16. In this embodiment, in matrix condenser 14*a* a matrix is applied to the aerosol on-line by a technique for a flowing aerosol stream. An example of a flow/condensation technique is given in Stowers et al. in Rapid Commun Mass Spectrom. 2000; 14:829–833 and Jackson et al. in Anal. Chem. 2002; 13:354–361, the entire contents of which are incorporated herein by reference. Other similar techniques and other techniques known in the art can be implemented in the present invention. Flow/condensation techniques introduce an aerosol into a region saturated with for example vapors of a matrix material, in which the matrix material condenses on the aerosol.

Aerosol drying, in one preferred embodiment of the present invention, is conducted rapidly in aerosol conditioning chamber 14*b*. Any one or more of the following dryers can be used, which may be applied in combination: Nafion dryers (Permapure Inc. Toms River, N.J.), desiccant diffusion dryers (e.g. TSI Inc., Shoreview, Minn.), heater, and dry counter-current winnowing flow, as described by Bottiger et al. in U.S. Pat. No. 5,918,254, the entire contents of which are incorporated herein by reference. Other drying techniques known in the art can be implemented in the present invention. Drying affects the operability of the present invention for UV AP-MALDI by allowing the solid matrix crystals to be laser ionized. Drying affects the operability of the present invention for application with IR AP-MALDI. Hence, the present invention can control the sample hydration content. For either UV or IR wavelength selected, solvent concentration, according to the present invention, can be controlled to optimize drying times and to control the final aerosol particle sizes.

As shown in FIG. 3, aerosol particles 30 in the aerosol beam 26 are laser desorbed/ionized in the ion source generation volume 16. The ion source generation region 16 includes an electric field adjacent to the entrance of a mass spectrometer established by a voltage plate 32. The voltage plate typically is charged to a high voltage electrostatic potential, but could as well be subject to a time-varying voltage. In one embodiment, both the gas flow and the electric field are toward the entrance of the mass spectrometer to thereby direct ions into the atmospheric pressure inlet 20 shown here as a capillary tube.

Because the aerosol is ionized in-flight, there is no collection substrate interaction. Furthermore, in one embodiment of the present invention, reflective mirrors 34 are utilized in the ionization region to increase the number of laser passes through the aerosol. A multipass laser system, according to the present invention, increases ionization and utilization of the laser energy.

Figure 4:
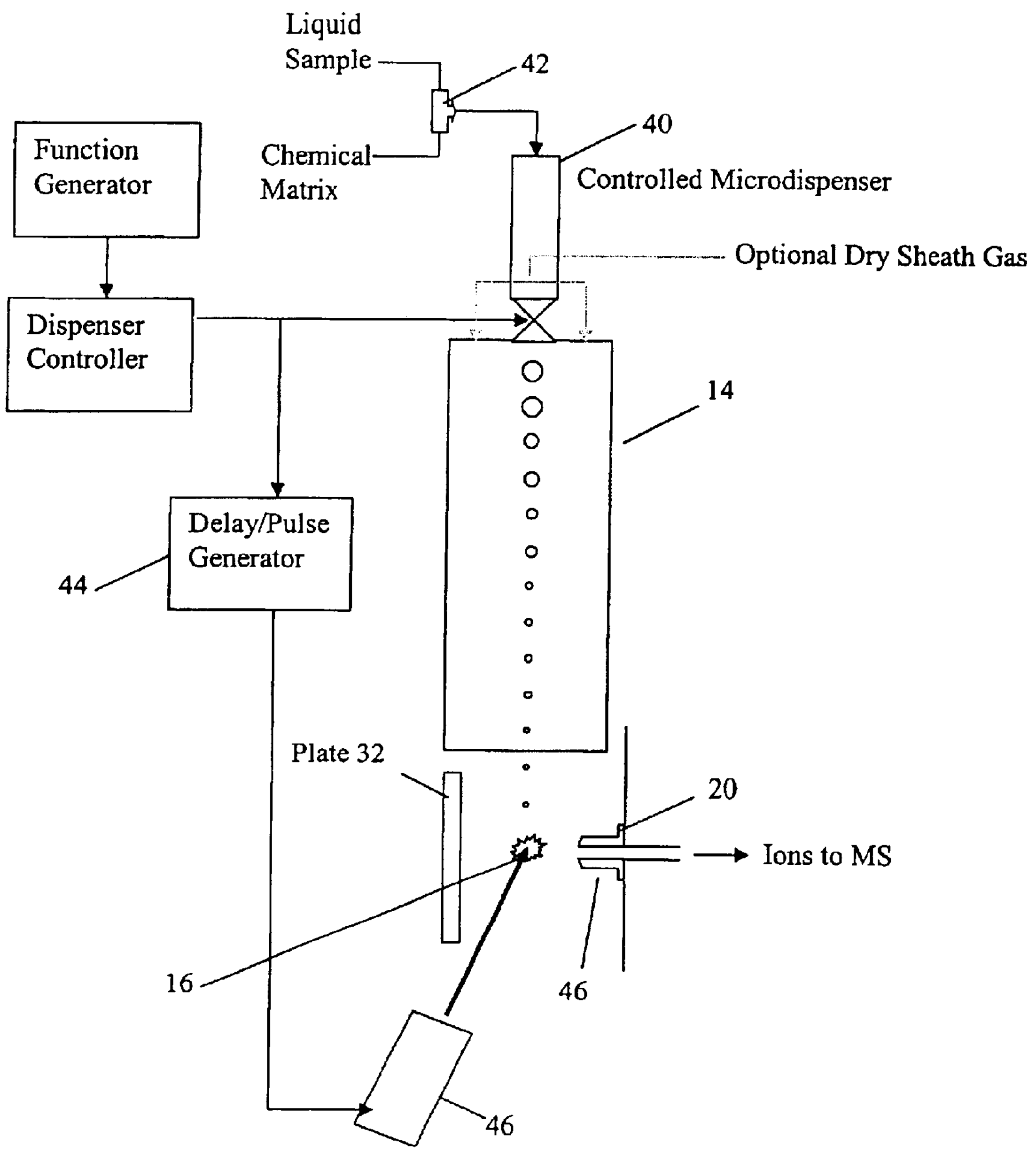
FIG. 4 is a diagram of one embodiment of the invention applied to a liquid sample.

In another preferred embodiment of the invention, the aerosol beam, as shown in FIG. 4, is created by a controlled microdispenser 40. The controlled microdispenser 40 generates and dispenses liquid aerosol particles at a rate equal to the laser repetition rate. A chemical matrix is added as shown in FIG. 4 via a mixing union 42. As the aerosol particles are dried, a delay/pulse generator 44 is used to appropriately trigger and fire a desorption/ionization laser 46 so as to intercept each individual dried/conditioned aerosol particle outside of the mass spectrometer entrance 20. In this preferred embodiment, only as much aerosol as can be ablated by the laser is generated so that sample loss is minimized. A dry sheath gas can be added to the drying chamber (e.g., the aerosol conditioning chamber 14*b*) to facilitate drying, solvent evaporation, and to aid in particle sphericity/uniformity.

According to the present invention, the apparatus shown in FIG. 4 can be applied to liquid separation techniques such as, but not limited to, liquid chromatography or capillary electrophoresis, so that these techniques can be coupled to MALDI-MS permitting sufficient sensitivity for mass analysis. Interfacing of on-line liquid separation methods with MALDI-MS increases the information content available from an analyte solution.

Figure 5:
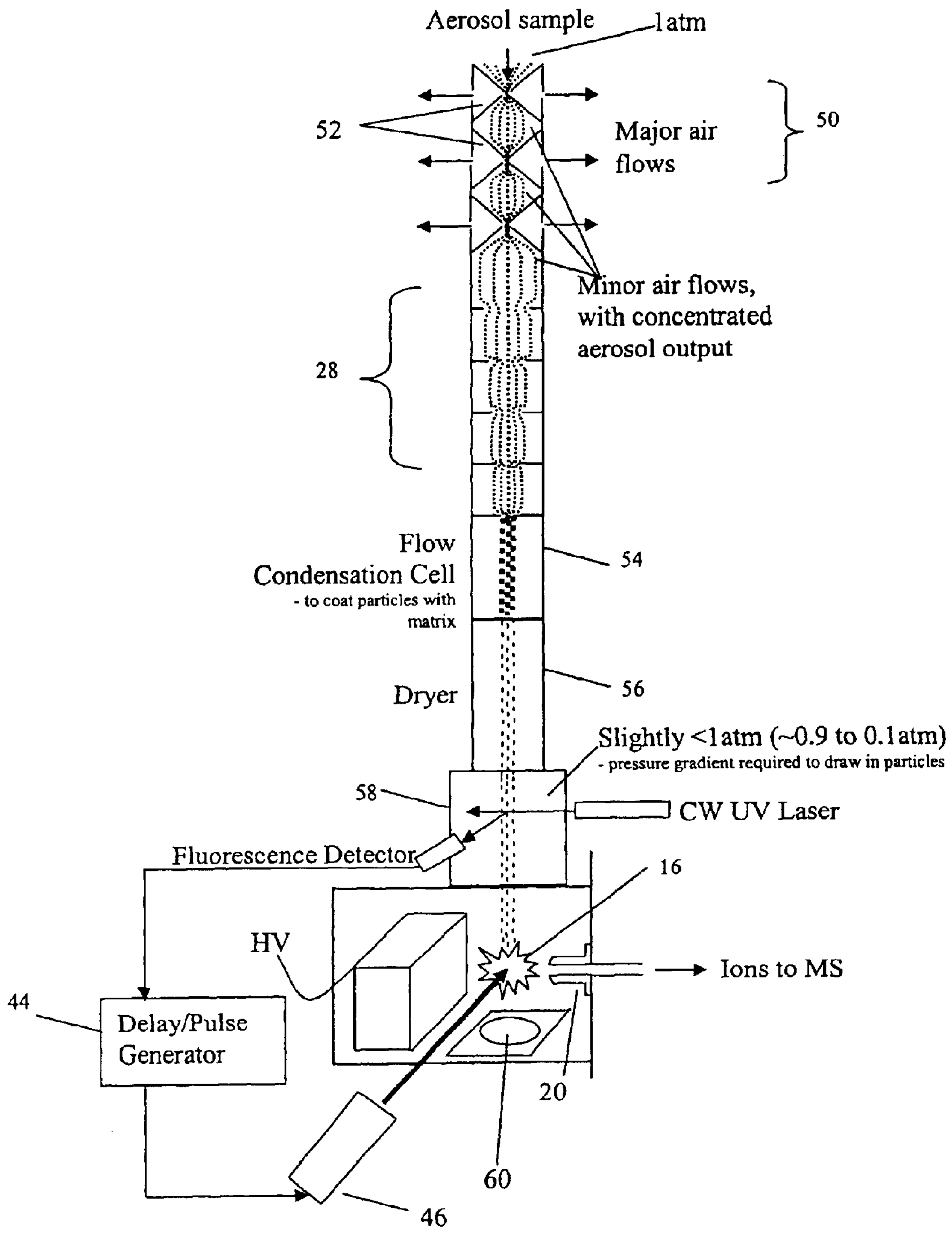
FIG. 5 is a diagram of another embodiment of the invention applied to an aerosol sample.

In another embodiment of the invention shown in FIG. 5, aerosol samples are subject to laser desorption/ionization and subsequent mass analysis without the use of a target laser substrate. In this embodiment, an aerosol of particles (illustrated but not limited to solid-phase particles) is first concentrated to increase the number of aerosol particles in a given volume of gas. A concentrator 50 includes a series of virtual impactors 52 where an aerosol beam including both a carrier gas and the particles, the particles having a higher inertia are drawn into the lower stages, while the gas is removed in each stage. Commercial concentrators suitable for the present invention are available for example from MesoSystems Inc. Kennewick, Wash., or MSP Corporation Shoreview, Minn., or Dycor Technologies Ltd. Edmonton, Alberta, Canada. Other concentrators can be incorporated in the present invention. The remaining aerosol containing mostly solid particles is maintained in a very small volume of gas at the end of the concentrator 50. A concentrator can be particularly useful for ambient aerosol systems and dilute aerosol situations encountered in environmental sampling. However, the concentrator can be omitted in situations where an aerosol is sufficiently concentrated.

The aerosol beam, in one embodiment of the present invention, can be subsequently focused by aerodynamic lenses 28 which have fluid streams lines directing aerosol toward a primary axis, and consequently a tight focus. To accomplish concentration and collimation, a pressure gradient is required which is preferably less than 1 atm at an exit of the aerodynamic lenses stack. The collimated aerosol is then coated in a flow condensation cell 54 with matrix material via an on-line approach, such as the aforementioned flow/condensation technique, and then dried for example in dryer 56.

The apparatus shown in FIG. 5 in one preferred embodiment is applied for analysis of bioaerosol samples whereby an optical bioaerosol detection system 58 is utilized in conjunction with the aerosol handling. As such, the present invention can detect airborne biological species (e.g. bacteria and spores). An optical bioaerosol detection system includes, for example, a continuous-wave UV laser focused on the collimated aerosol beam and/or a fluorescence wavelength detector used to identify potential bioaerosols. In such an arrangement, bioaerosols are selectively detected and used to appropriately trigger (via the delay/pulse generator 44) the pulsed desorption/ionization laser when a bioaerosol is in the ionization region 16 of the system. Close proximity of the detection system to the desorption/ionization laser is preferred, as different particle sizes would be expected to have different transit times from detection to the ablation zone (i.e. the ionization region 16). Otherwise, a variable delay/pulse time will be set according to the present invention to synchronize laser irradiation with the arrival of the particles in the ionization region. In one embodiment, particles not ablated by the laser collect on a downstream impaction surface 60. These particles can be used for off-line analyses or archiving. When the aerosol is collimated, and not generated individually in a controlled-manner, the present invention can ionize (instead of only 1 particle being ionized per laser shot, i.e. "a single-particle analysis") more than one particle in the ionization spatial volume at once.

Figure 6:
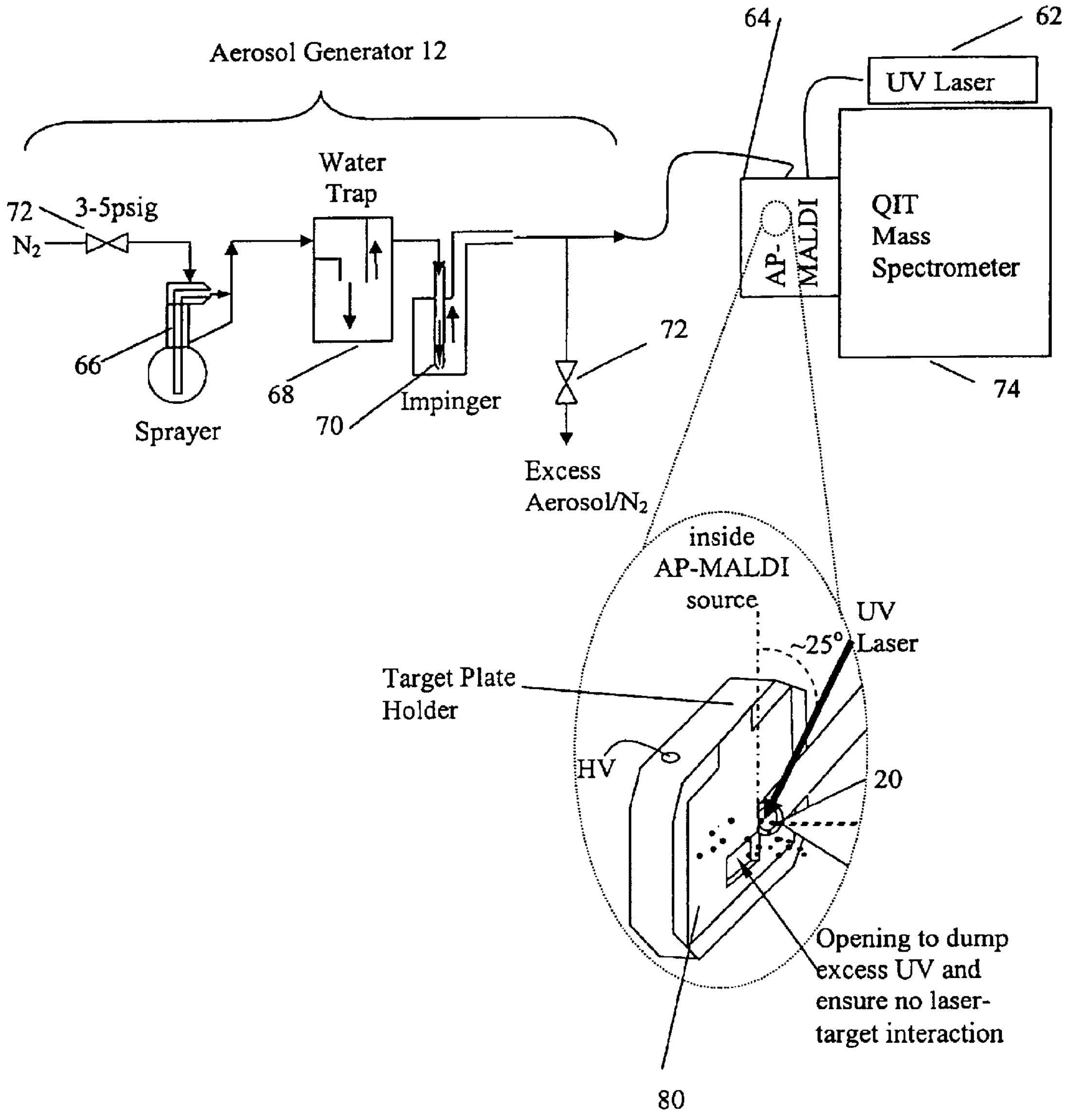
FIG. 6 is a diagram of an experimental setup utilized to demonstrate the present invention.

A non-limiting working example for one embodiment of the present invention is shown in FIG. 6. In this illustrative example of a "substrate-less" configuration, 1) aerosols were introduced into a space between a target surface and a mass spectrometer inlet of an AP/MALDI ion source 64 (e.g., an AP/MALDI ion source from MassTech Inc, Burtonsville, Md.), 2) a standard UV laser 62 for conventional AP/MALDI was focused onto the aerosol output, in contrast to previous focusing of the laser onto a target plate (depicted here as target plate 80), and 3) an electric field in the ionization volume was set nominally to 10 kV/cm.

For aerosol generation, an atomizer 66 (e.g. an atomizer from Kontes ; KT422550-0000, KT213100-0214, Vineland, N.J.), connected to a water trap 68 (e.g. a water trap from Penn Air & Hydraulics, F72G-3AN-QL3, York, Pa.), and impinger 70 (e.g. an impinger from Kontes; KT737560-0000, Vineland, N.J.) was assembled with stainless steel hose connectors and tubing (both peroxide-cured Silicone & Tygon High-Purity tubing) to create aerosol as depicted. Two low-flow pressure regulators 72 (e.g. regulators from Penn Air and Hydraulics; R07-202-RGAA) were used to control the flow rate, number concentration and size distribution of the aerosol output.

The aerosols generated from this setup were introduced into the AP/MALDI ion source via Tygon High Purity tubing (OD 3/16", ID 1/16") and directed to flow in the space between the AP/MALDI target plate, and the inlet of a quadrupole ion trap (QIT) mass spectrometer 74 (e.g. a mass spectrometer from Thermo Finnigan, LCQ Deca XP, San Jose, Calif.). The output of the aerosol was less than 3 mm from the MS inlet at its closest separation distance (see magnification inset shown on FIG. 6). The liquid sample consumption rate was approximately up to 5 mL/min, and the aerosol generated was likely predominated by particles in the submicron size range.

The UV laser from the AP/MALDI ion source, conventionally focused onto the target plate 80 directly in front of the MS inlet, was instead focused onto the aerosol output. Further, to avoid any target-laser interactions and to ensure that the analysis was indeed substrate-free, a large hole was milled out where the laser was to intersect the target. The angle of the UV laser beam relative to the target plate was ~25° (see magnification in FIG. 6). A laser attenuation setting for the laser was set to a value of 7.5, yielding an ~100 μJ/pulse UV beam, focused into ~1 mm diameter spot. The high voltage used on the target plate was set to 0.5 kV/mm to avoid corona discharge effects from the aerosol tubing almost touching the target plate.

A solution was prepared for aerosolization and analysis from the following matrix and solvents (i.e. the matrix solution): 1.5 mg/mL of CHCA (alpha-cyanno-4-hydroxycinnaminic acid—Fluka), 25% v/v of methanol (Sigma), 20% v/v of isopropanol (Sigma), 2% v/v of acetic acid (Sigma), the notation v/v indicating a % by volume as opposed to % by mass, or % by mole, etc. The proteins tested were Angiotensinogen Fragment 11–14 (481.6 Da—Sigma) and Leucine Enkephalinamide (554.6 Da—Sigma). Angiotensinogen Fragment was analyzed at a concentration of 10 pmol/μL of matrix solution, and Leucine Enkephalinamide was analyzed at a concentration of 20 pmol/μL of matrix solution.

An on-line, substrate-free (without any aerosol collection) mass analysis was obtained. MALDI samples of peptides (Angiotensinogen Fragment 11–14, 482 Da; Leucine Enkephalinamide, 555 Da) were initially introduced in an aerosol form, and ionized at atmospheric pressure and sampled into a quadrupole ion-trap mass spectrometer (QIT-MS).

Figure 7A:
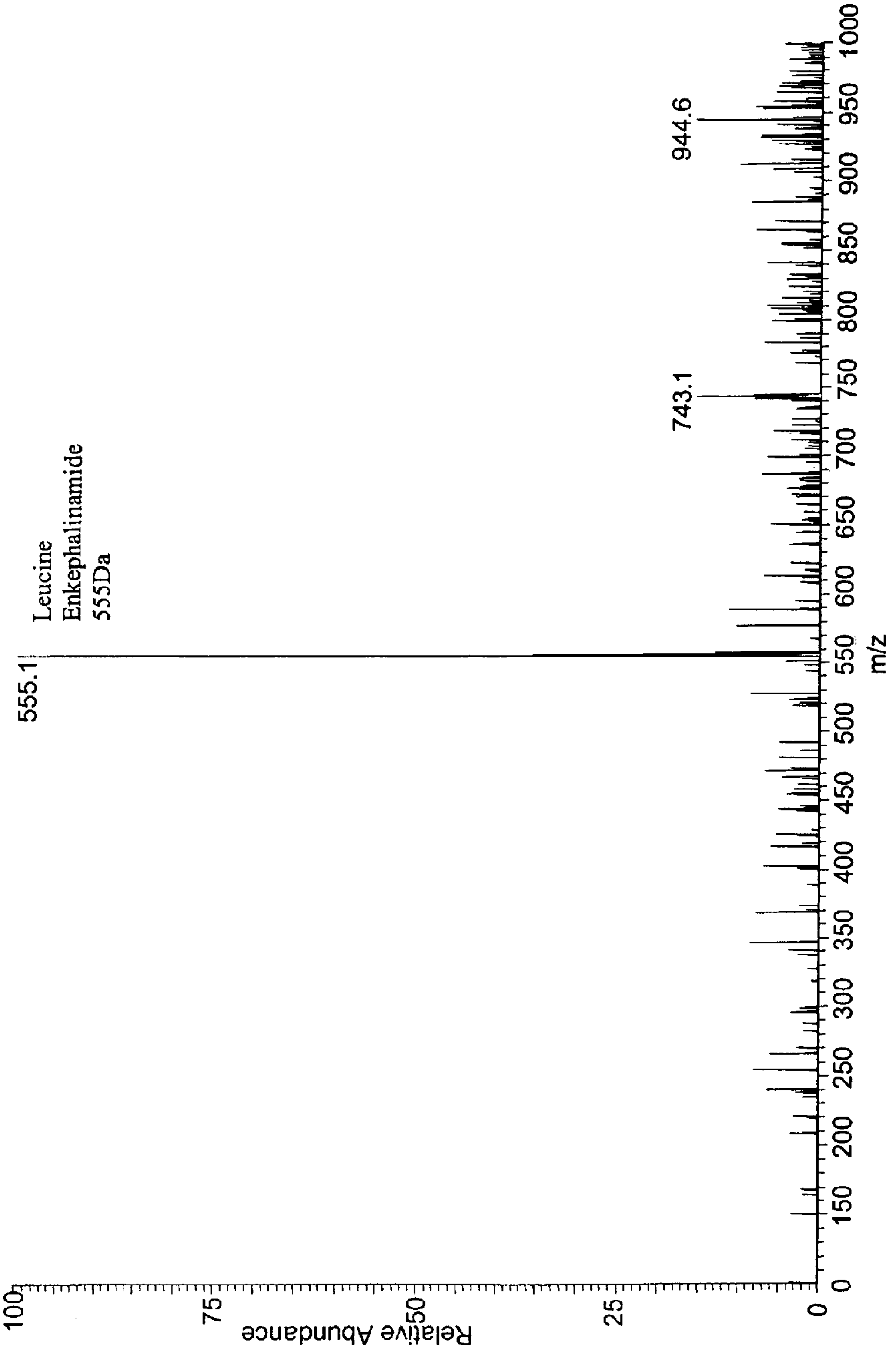
FIGS. 7A–B are plots of mass spectral results from application of the present invention to peptides.
Figure 7B:
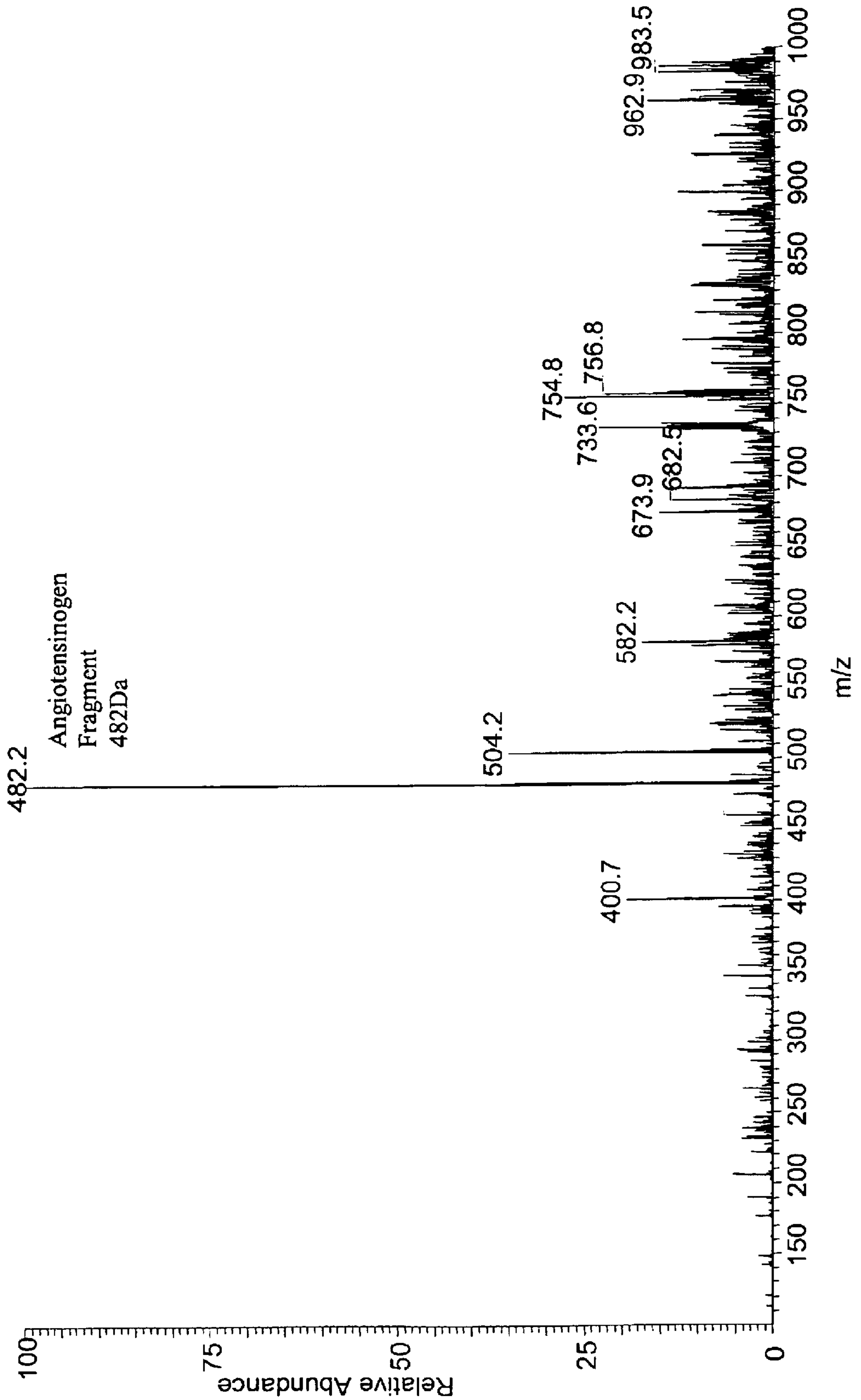

Mass spectral results of the proteins Angiotensinogen Fragment 11–14 and Leucine Enkephalinamide are attached in FIGS. 7A and 7B, respectively. The mass spectra indicate the presence of the molecular ion peaks of the analytes in both cases. The sodiated molecular ion peak at 504.2 Da also appears in the spectrum of Angiotensinogen. Samples were acquired after 1 minute averaging and using a boxcar 15 point smoothing method. Spectra are the result of nominally nanomole [(10 pmol/μL)*(~5000 μL/min)*1 min] amounts of analyte. There appears only a small background signal from chemical noise. Application of the experimental apparatus with the aerosol source turned off also showed a low background with the absence of any discernable peaks.

The present invention demonstrates ionization of aerosols at or near atmospheric pressures. Further, as discussed above, the integration of liquid chromatography techniques with the aerosol MALDI technique of the present invention can provide a powerful analytical tool.

Figure 8:
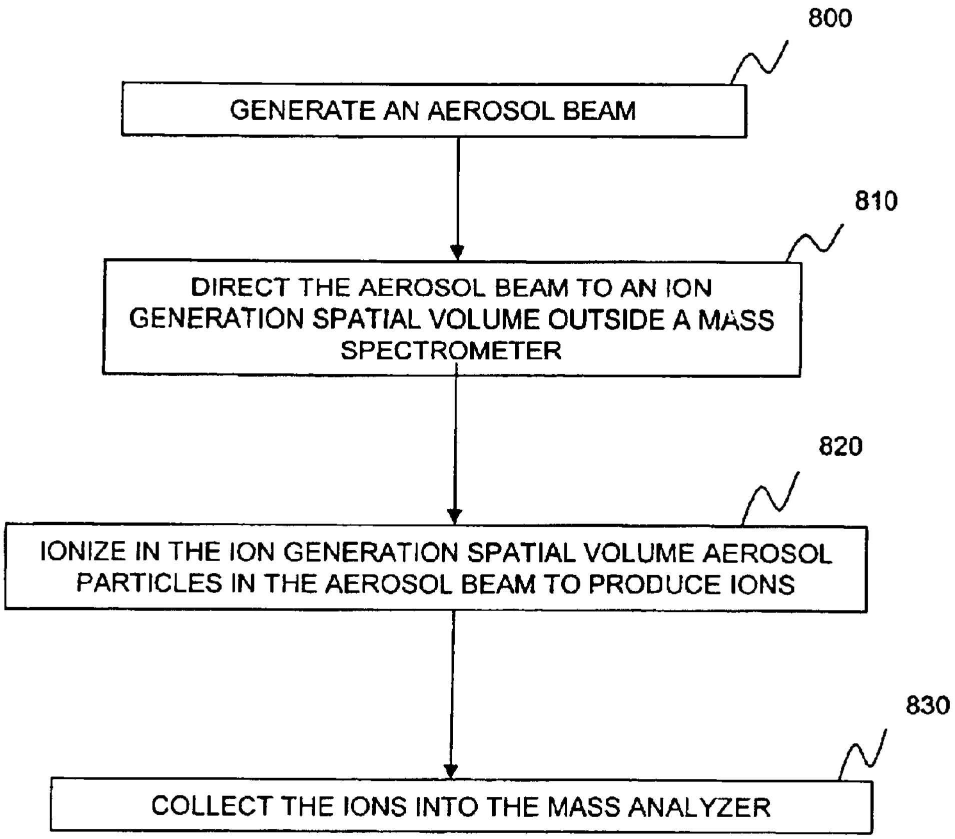
FIG. 8 is a flowchart illustrating one general method of the present invention.

Thus, in preferred embodiments, the present invention includes any apparatus and method for generating ions from an aerosol for mass analysis. As illustrated in FIG. 8, an aerosol beam is generated at step 800. At step 802, the aerosol beam is directed to an ion generation spatial volume outside a mass analyzer. At step 804, ions are produced in the ion generation spatial volume from aerosol particles in the aerosol beam. At step 806, ions are collected into the mass analyzer.

At step 800, the aerosol beam can be produced via application of a piezoelectric pulse to a liquid fluid, by microdispensing a liquid fluid into atmospheric or near atmospheric pressures, or by dispensing a liquid fluid into atmospheric or near atmospheric pressures via a vibrating orifice. The generation of the aerosol beam is preferably synchronized with the step of ionizing for example, generation of aerosol beam can be synchronized with a laser pulse.

Further, at step 800, the aerosol beam can be generated by collimating a diffuse aerosol source to form a low divergence, collinear aerosol beam. The process of collimating can selectively focus a specific size of the aerosol particles while disregarding other sized aerosol particles. There are a number of known aerosol beam generation techniques which utilize for example a critical orifice to thereby select a specific size of aerosol to be centrally (i.e., axially) focused, while other particles are made to diverge from the central axis. Alternatively, the aerosol beam generator of the present invention can "monodisperse" a single size of aerosol particle into the laser ionization region for analysis.

The aerosol source of the present invention can produce particles from a non-gas phase source at atmospheric or near atmospheric pressures by an atomization process. For example, the aerosol source can produce particles from a liquid phase by nebulization. In this case, for example, the aerosol beam can be derived from a liquid chromatography source. Alternatively, the aerosol source can dispense particles from a dry powder. Further, an aerosol can sample from a gas stream containing existing aerosol particles. Such sampling can increase a number of aerosol particles in a given gas volume and/or selectively concentrate the aerosol particles in a smaller gas volume. Further, the sampling can detect and identify the aerosol particles via UV fluorescence, permitting for example selective detection and selective ionization of for example bioaerosols in an aerosol beam.

Further, an aerosol beam can be conditioned to enhance ionization by drying the aerosol beam, (i.e., vaporizing solvent from the aerosol beam), by producing spherical particles in the aerosol beam, and/or by adding a chemical matrix to the aerosol beam. The chemical matrix can be added prior to or after generating the aerosol beam.

At step 802, the aerosol beam can be directed by repositioning an aerosol beam generator of the aerosol beam such that an angular adjustment to an axis of the aerosol beam is affected.

At step 804, ionization can occur or at an intermediate pressure below atmospheric pressure and above a vacuum pressure of a detector in the mass analyzer. Ions can be generated by laser ionization of the aerosol particles in the beam. The laser can ionize either solid-phase particles in the aerosol beam or liquid-phase particles in the aerosol beam. Laser ionization can be assisted by a chemical matrix present in the aerosol beam and/or on the particles. Further, besides laser ionization, flash vaporization of the aerosol particles can be used to generate ionic species for mass analysis.

At step 806, the ions can be entrained in a gas flow towards an entrance of the mass analyzer or alternatively in a gas flow away from an entrance of the mass analyzer. Counter flow of gas away from the entrance of the mass analyzer can more selectively collects ions rather than neutral species into the mass analyzer. For example, at step 806, the ions can be collected by transporting the ions in a static or time-variable electric field.

Accordingly, an apparatus of the present invention for generating and transferring ions into a mass analyzer includes an aerosol beam generator configured to generate an aerosol beam of an aerosol, an ion source generator ionizing aerosol particles in the aerosol beam in a spatial volume outside the mass analyzer to therein produce the ions, and an ion collector configured to collect the ions from the spatial region and transfer the ions into the mass analyzer.

The aerosol beam generator can include an aerosol positioning device configured to direct the aerosol beam to the spatial volume proximate to the mass analyzer. A condensation/evaporation cell can be included to condense a chemical matrix onto the aerosol particles, thereby enhancing laser ionization. Alternatively, a combiner can be included to add the chemical matrix to an analyte prior to aerosol generation. The aerosol beam generator can be a piezoelectric nozzle device, a solenoid microdispenser device, a liquid jet nozzle, and/or a vibrating orifice aerosol generator.

In one embodiment of the present invention, the aerosol beam generator constitutes a diffuse aerosol source and a collimator device. The diffuse aerosol source can be for example an atomizer, a nebulizer, and/or a dry powder disperser. The collimator device can include an aerodynamic lens and/or an electrostatic lens. As such, the aerosol beam generator can be an aerosol concentrator. The collimator device can be a sized orifice configured to admit a specific size of the aerosol particle to a central axis of the collimator. Further, a time-of-flight aerosol sizing device can be included to selectively size the particles in the aerosol beam.

The aerosol beam generator, in one embodiment of the present invention, can include an aerosol conditioner. The aerosol conditioner can include a heated tube, a desiccant diffusion dryer, or a membrane dryer all configured to dry the aerosol beam of solvents. Alternatively, the aerosol conditioner can provide a sheath gas (heated or not) to dry the aerosol beam, and the aerosol conditioner can provide a winnowing flow (heated or not) to exhaust the aerosol conditioner in a direction transverse to a direction of the aerosol beam. The winnowing flow can be provided to aid in drying the aerosol beam.

Further, a light-scattering sizing/detection device can be included to determine a size of the aerosol particles. The light-scattering sizing/detection device can be, for example, a UV fluorescence detection device.

The ion source generator can include a pulsed laser whose pulse intensities are sufficient to ionize aerosol particles in the aerosol beam. A reflecting device can be included to reflect light from the pulsed laser within the spatial volume to thereby improve utilization of the laser pulses and to increase ionization of the aerosol particles in the aerosol beam. In one embodiment of the present invention, the ion source generator can include a heated surface which ionizes the aerosol particles upon impact of the ions on the heated surface. The ion source generator (regardless of type) can operate at or near atmospheric pressures (e.g. 100–1000 Torr). In one configuration, the ion source generator operates at an intermediate pressure below atmospheric pressure and above a vacuum pressure of a detector in the mass analyzer. The vacuum pressure at the detector in the mass analyzer typically being less than 1 mTorr. A delay/pulse generator can be included to trigger the ion source generator. For example, the delay/pulse generator can trigger a pulsed laser in synchronization with aerosol particle arrival in the ionization region.

Once ions are generated in the apparatus of the present invention, the ions are collected via an ion collector into a mass analyzer (e.g. a mass spectrometer). The ion collector can entrain the ions in a gas flow towards an inlet to the mass analyzer. A voltage plate opposite an entrance to the mass spectrometer can provide a drift electric field to collect the ions. A gas flow opposite the drift field may be used to preferentially enhance the concentration of ionic to neutral species at the entrance of the mass analyzer.

Hence, the present invention in general includes any apparatus and method which generates a medium including an analyte for mass analysis, injectss the medium into an ion generation spatial region outside a mass analyzer, ionizes in the ion generation spatial region from the injected medium a portion of the analyte in the medium to produce the ions, and collects the ions into the mass analyzer. The apparatus and method ionize a portion of the analyte without collection of the analyte on a substrate such as would be involved for example in standard MALDI techniques where the analyte is collected on a substrate for direct laser desorption/ionization. The medium may preferably be an aerosol containing either solid or liquid particles of the analyte. The medium may preferably include a chemical matrix to provide for laser desorption/ionization of the analyte.

Numerous modifications and variations of the present invention are possible in light of the above teachings. It is therefore to be understood that within the scope of the appended claims, the invention may be practiced otherwise than as specifically described herein.

What is claimed is:

1. A method for generating ions for mass analysis, comprising:

generating an aerosol beam;

directing the aerosol beam to an ion generation spatial volume outside a vacuum of a mass analyzer;

laser ionizing in said ion generation spatial volume aerosol particles in said aerosol beam outside the vacuum of the mass analyzer to produce said ions at or near atmospheric pressure; and collecting said ions into the mass analyzer.

2. The method of claim 1, wherein said collecting comprises:

entraining said ions in a gas flow towards an entrance of the mass analyzer.

3. The method of claim 1, wherein said collecting comprises:

flowing a gas away from an entrance of the mass analyzer; and directing said ions toward said entrance by an electric field.

4. The method according to claim 1, wherein said ionizing occurs at an intermediate pressure below atmospheric pressure and above a pressure of a detector in the mass analyzer.

5. The method of claim 1, wherein said ionizing comprises:

generating said ions by laser ionization of said aerosol particles.

6. The method of claim 5, wherein said generating said ions by laser ionization of said aerosol particles comprises:

ionizing at least one of solid-phase particles in the aerosol beam or liquid-phase particles in the aerosol beam.

7. The method of claim 5, wherein said generating said ions by laser ionization of said aerosol particles comprises:

generating said ions by laser ionization of a chemical matrix in said aerosol beam.

8. The method of claim 1, wherein said collecting comprises:

transporting said ions in an electric field.

9. The method of claim 8, wherein said transporting comprises:

transporting said ions in a time-variable electric field.

10. The method of claim 1, wherein said generating an aerosol beam is synchronized with said step of ionizing.

11. The method of claim 1, wherein said generating comprises:

producing said aerosol beam via application of a piezoelectric pulse to a liquid fluid.

12. The method of claim 1, wherein said generating comprises:

producing said aerosol beam by microdispensing a liquid fluid into atmospheric or near atmospheric pressure.

13. The method of claim 1, wherein said generating comprises:

producing said aerosol beam by dispensing a liquid fluid into atmospheric or near atmospheric pressure via a vibrating orifice.

14. The method according to claim 11, 12, or 13, wherein said generating an aerosol beam is synchronized with said step of ionizing.

15. The method of claim 14, wherein said generating an aerosol beam is synchronized with a laser pulse.

16. The method of claim 1, wherein said generating an aerosol beam comprises:

collimating a diffuse aerosol source.

17. The method of claim 16, wherein said collimating comprises:

focusing said aerosol beam from said diffuse aerosol source into a collinear beam.

18. The method of claim 16, wherein said collimating comprises:

selectively focusing a specific size of said aerosol particles.

19. The method of claim 1, wherein said generating comprises:

sampling existing aerosol particles from a gas stream.

20. The method of claim 19, wherein said sampling comprises:

increasing a number of aerosol particles in a given gas volume.

21. The method of claim 20, wherein said increasing comprises:

sizing said particles in the gas volume.

22. The method of claim 19, wherein said sampling comprises:

detecting said particles via UV fluorescence.

23. The method of claim 24, wherein said detecting selectively analyzes a bioaerosol.

24. The method of claim 19, wherein said sampling samples an airborne biological species.

25. The method of claim 24, wherein said sampling samples at least one of bacteria and spores.

26. The method of claim 1, wherein said generating comprises:

atomizing particles from a non-gas phase source into an atmospheric or near atmospheric pressure.

27. The method of claim 26, wherein said atomizing comprises:

nebulizing a liquid to produce said atomized particles.

28. The method of claim 1, wherein said generating comprises:

dispensing particles from a powder into an atmospheric or near atmospheric pressure.

29. The method of claim 1, wherein said generating comprises:

conditioning said aerosol beam to enhance said ionizing.

30. The method of claim 29, wherein said conditioning comprises:

drying the aerosol beam.

31. The method of claim 29, wherein said conditioning comprises:

vaporizing solvent from the aerosol beam.

32. The method of claim 29, wherein said conditioning comprises:

producing spherical particles in said aerosol beam.

33. The method of claim 29, wherein said conditioning comprises:

adding a chemical matrix to the aerosol.

34. The method of claim 33, wherein said adding occurs prior to said generating.

35. The method of claim 33, wherein said adding occurs after said generating and said chemical matrix is condensed on said aerosol particles.

36. The method of claim 1, wherein said directing comprises:

angularly adjusting a direction of said aerosol beam.

37. The method of claim 1, wherein said generating generates said aerosol beam from a liquid chromatography source.

38. The method of claim 1, wherein said ionizing occurs in said ion generation spatial volume proximate to an entrance to said mass analyzer.

39. An apparatus for generating and transferring ions into a mass analyzer, comprising:

an aerosol beam generator configured to generate an aerosol beam;

an ion source generator configured to laser ionize aerosol particles in said aerosol beam in a spatial volume outside a vacuum of the mass analyzer to produce therein said ions at or near atmospheric pressure; and an ion collector configured to collect the ions from said spatial volume and transfer the ions into the mass analyzer.

40. The apparatus of claim 39, further comprising:

an aerosol positioning device configured to direct the aerosol beam to said spatial volume.

41. The apparatus of claim 39, wherein said ion source generator comprises a pulsed laser configured to ionize said aerosol particles.

42. The apparatus of claim 41, further comprising:

a reflecting device configured to reflect light from said pulsed laser within said spatial volume.

43. The apparatus of claim 39, further comprising:

a condensation/evaporation cell configured to condense a chemical matrix onto said aerosol particles.

44. The apparatus of claim 39, further comprising:

a combiner configured to combine a chemical matrix and an analyte prior to aerosol generation.

45. The apparatus of claim 39, wherein said ion source generator is configured to operate at an intermediate pressure below atmospheric pressure and above a pressure of a detector in the mass analyzer.

46. The apparatus of claim 39, wherein said ion collector comprises a voltage plate opposite an entrance to the mass spectrometer.

47. The apparatus of claim 39, wherein said aerosol beam generator comprises a collimated aerosol beam generator.

48. The apparatus of claim 39, wherein said aerosol beam generator comprises at least one of a piezoelectric nozzle device, a solenoid microdispenser device, a liquid jet nozzle, and a vibrating orifice aerosol generator.

49. The apparatus of claim 39, further comprising:

a delay/pulse generator configured to trigger said ion source generator.

50. The apparatus of claim 49, wherein said delay/pulse generator triggers a pulsed laser.

51. The apparatus of claim 39, wherein said aerosol beam generator comprises a diffuse aerosol source and a collimator device.

52. The apparatus of claim 51, wherein said diffuse aerosol source comprises at least one of an atomizer, a nebulizer, and a powder disperser.

53. The apparatus of claim 51, wherein said collimator device comprises an aerodynamic lens.

54. The apparatus of claim 51, wherein said collimator device comprises an electrostatic lens.

55. The apparatus of claim 51, wherein said collimator device comprises an orifice aerosol inlet configured to focus a specific size of said aerosol particle.

56. The apparatus of claim 39, wherein said aerosol beam generator comprises an aerosol concentrator.

57. The apparatus of claim 56, wherein said aerosol concentrator comprises a particle concentrator.

58. The apparatus of claim 56, further comprising:

a time-of-flight aerosol sizing device configured to size said aerosol particles in the aerosol beam.

59. The apparatus of claim 39, further comprising:

a light-scattering sizing/detection device configured to determine a size of said aerosol particles.

60. The apparatus of claim 59, wherein said light-scattering sizing/detection device comprises a UV fluorescence device.

61. The apparatus of claim 39, wherein said aerosol beam generator comprises an aerosol conditioner device.

62. The apparatus of claim 61, wherein said aerosol conditioner comprises a heated tube configured to dry said aerosol beam of solvents.

63. The apparatus of claim 61, wherein said aerosol conditioner comprises at least one of a desiccant diffusion dryer and a membrane dryer configured to dry said aerosol beam of solvents.

64. The apparatus of claim 61, wherein said aerosol conditioner is configured to provide a sheath gas which dries said aerosol beam of solvents.

65. The apparatus of claim 64, wherein said aerosol conditioner is configured to preheat said sheath gas.

66. The apparatus of claim 61, wherein said aerosol conditioner is configured to provide a winnowing flow to exhaust said aerosol conditioner in a direction transverse to said aerosol beam.

67. The apparatus of claim 66, wherein said aerosol conditioner is configured to preheat said winnowing flow.

68. The apparatus of claim 39, wherein said aerosol beam generator is configured to angularly direct said aerosol beam.

69. The apparatus of claim 39, wherein said ion source generator is configured to ionize aerosol particles in said spatial volume proximate to the mass analyzer.

70. A method for generating ions for mass analysis, comprising:

generating a medium including an analyte for said mass analysis;

injecting the medium into an ion generation spatial region outside a vacuum of a mass analyzer;

laser ionizing in said ion generation spatial region from the injected medium a portion of said analyte without collection of the analyte on a substrate to produce said ions outside the vacuum of the mass analyzer at or near atmospheric pressure; and collecting said ions into the mass analyzer.

71. The method of claim 70, wherein said generating adds a chemical matrix to the analyte.

72. An apparatus for generating and transferring ions into a mass analyzer, comprising:

a generator configured to generate a medium including an analyte for said mass analysis;

an injector configured to inject the medium into a spatial region outside a vacuum of the mass analyzer;

an ion source generator configured to laser ionize from the injected medium a portion of said analyte in said medium without collection of the analyte on a substrate to produce therein said ions outside the vacuum of the mass analyzer at or near atmospheric pressure; and an ion collector configured to collect the ions from said spatial region and transfer the ions into the mass analyzer.

73. The apparatus of claim 72, further comprising:

a combiner configured to add a chemical matrix to the analyte.

74. A method for generating ions for mass analysis, comprising:

generating an aerosol beam from a liquid;

directing the aerosol beam to an ion generation spatial volume outside a vacuum of a mass analyzer;

drying the aerosol particles;

flash vaporizing aerosol particles in said ion generation spatial volume outside the vacuum of the mass analyzer to produce from said aerosol beam said ions at or near atmospheric pressure; and collecting said ions into the mass analyzer.

75. An apparatus for generating and transferring ions into a mass analyzer, comprising:

an aerosol beam generator configured to generate an aerosol beam from a liquid;

an aerosol beam dryer configured to dry the aerosol particles;

an ion source generator configured to flash vaporize aerosol particles in a spatial volume outside a vacuum of the mass analyzer to produce from said aerosol beam said ions at or near atmospheric pressure; and an ion collector configured to collect the ions from said spatial volume and transfer the ions into the mass analyzer.

* * * * *